3,134,088
LANDING GEAR WARNING SYSTEM
Wayne D. Sarver, United States Air Force (122 Golden Gate Ave., Tacoma, Wash.), and Thomas J. Stolle, United States Air Force (Box 201, Lytle, Tex.)
Filed July 7, 1961, Ser. No. 122,452
3 Claims. (Cl. 340—27)

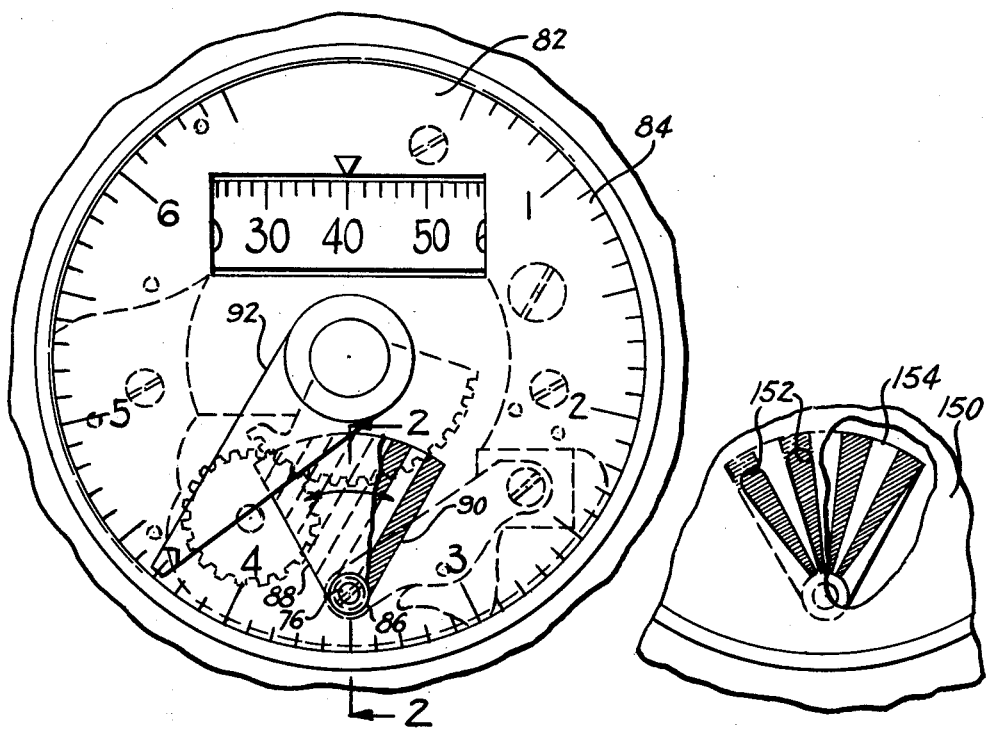
FIG. 1
FIG. 10
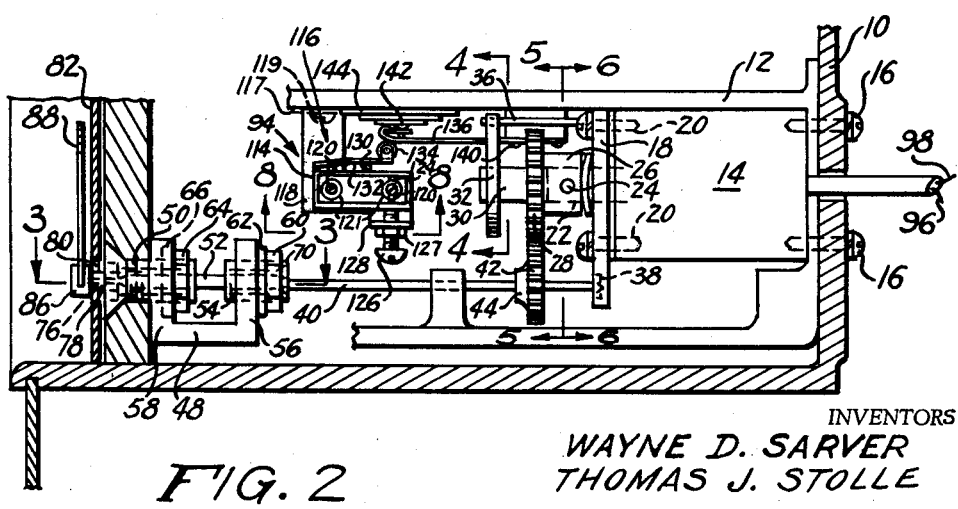
FIG. 2
INVENTORS
WAYNE D. SARVER
THOMAS J. STOLLE
BY Gustave Miller
ATTORNEY

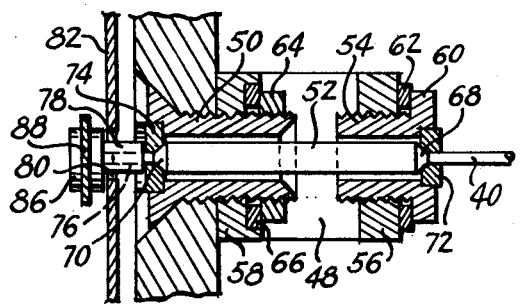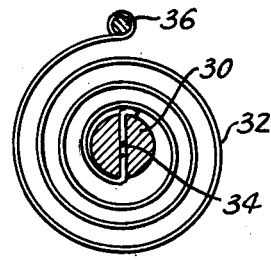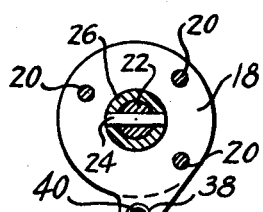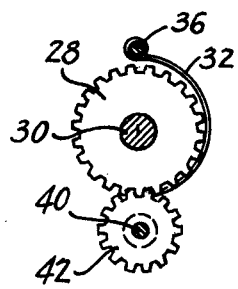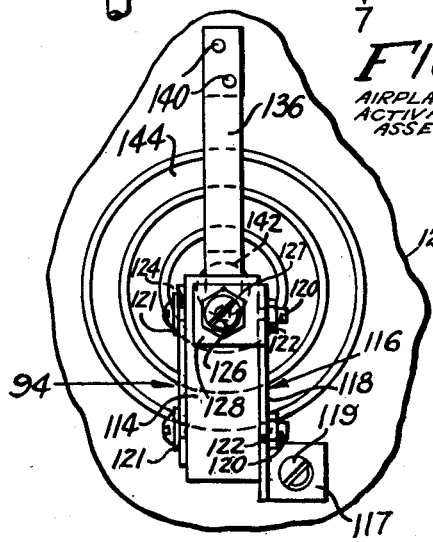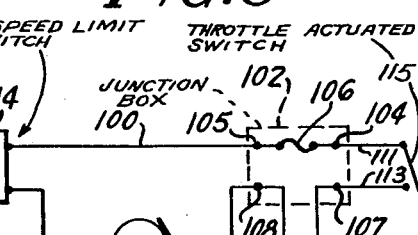
INVENTORS
WAYNE D. SARVER
THOMAS J. STOLLE
ATTORNEY

This invention relates to a warning system for airplanes, and it particularly relates to a warning system for signaling when the landing gear of an airplane has not been properly lowered during landing.

Although various different types of landing gear warning systems have been used heretofore, the present invention utilizes the concept of providing a visual signal on the face of the airspeed indicator in recognition of the fact that the airspeed indicator is the instrument which is constantly being monitored during all approaches and landings and such a visual signal would be most apparent to the pilot. This provides the primary object of the present invention.

Another object of the present invention is to provide a warning system coupled to the airspeed sensing mechanism.

Another object of the present invention is to provide a visual warning system of the above type which is easily adapted to be connected into the standard warning signal system.

Other objects of the present invention are to provide an improved visual warning system of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

FIG. 1 is a front elevational view of the dial face of a speed indicator in which is provided a visual warning indicator embodying the present invention.

FIG. 2 is a sectional view of a housing within which is shown the visual warning system actuating means, this means being illustrated in side elevation.

FIG. 3 is a sectional view taken on line 3—3 of FIG. 2.

FIG. 4 is a view taken on line 4—4 of FIG. 2.

FIG. 5 is a view taken on line 5—5 of FIG. 2.

FIG. 6 is a view taken on line 6—6 of FIG. 2.

FIG. 7 is an enlarged detailed view of one of the shaft bearings.

FIG. 8 is a view taken on line 8—8 of FIG. 2.

FIG. 9 is a schematic, wiring diagram showing the hook-up for the signal actuating mechanism.

FIG. 10 is a view of a modified form of visual signal device.

Referring now in greater detail to the drawings wherein similar reference characters refer to similar parts, there is shown a housing 10 having an internal support frame 12 to which is connected a low enertia motor 14. The motor 14 is connected through the frame 12 to the outer end of the housing 10 by screws 16.

At the front end of the motor 14 is secured a face plate 18 by means of screws 20. The motor shaft 22 extends through a central opening in the face plate 18 and is provided with a transverse bore to receive a set pin 24 for securing a gear extension 26 on the shaft 22. The gear extension 26 is integral with a gear 28 from the opposite face of which extends an axial spindle 30. A torsion spring 32 has its inner end 34 sweat-soldered to spindle 30 while the outer end of spring 32 is connected to pin 36 which extends forwardly from the upper portion of face plate 18.

The lower portion of face plate 18 is provided with a jewelers bearing 38 within which is rotatably positioned the pointed end of a shaft 40. The shaft 40 supports a gear 42 in mesh with gear 28, the gear 42 being provided with a supporting hub portion 44 through which shaft 40 passes.

The shaft 40 also extends through a yoke 48 held in housing 10 by means of a hollow screw 50. The shaft 40 is provided with an enlarged portion 52 in the area of the yoke 48 and passes through a hollow bushing 54 on the rear arm 56 of the yoke as well as through the hollow screw 50 on the front arm 58 of the yoke. The bushing 54 and hollow screw 50 act as bearings for the enlarged portion 52 of the shaft 40, as best seen in FIG. 3. The bushing 54 is provided with a nut flange 60 which allows for positioning bushing 54 in and out of yoke 56 and is locked in position by lock nut 62. The hollow screw 50 is provided with a nut 64 which bears against a lock washer 66 positioned in a recess in the inner face of yoke arm 58.

The enlarged portion 52 is provided with a tapered end 68 at one end and another tapered end 70 at the opposite end, the tapered end 68 being rotatably seated in a bearing member 72 and the tapered end 70 being rotatably seated in bearing member 74 whereby the shaft 40 is firmly but rotatably supported in the yoke 48.

A reduced end portion 76 of the shaft 40 extends forwardly from portion 52 and through a sleeve 78. This sleeve 78 is an integral part of a hub 86 and extends through an opening 80 in a dial face 82 on a speed indicator 84 (as best shown in FIG. 1). It is press-fitted to the reduced portion 76 of shaft 40 (in the same manner as the hands of a watch are fitted to its shaft). The hub 86 supports a fan-shaped flag 88 of relatively thin sheet material, preferably metal or the like; and this flag 88 rests, in its normal position in overlying relationship to a corresponding fan-shaped portion of the dial face, as indicated at 90 in FIG. 1. The portion 90 is illustrated as consisting of a series of cross-hatched lines or stripes in alternate colors, the preferable colors being red and yellow.

As stated above, when in normal or unenergized position, the flag 88 will completely cover the portion 90 so that the dial face will have its usual appearance; however, when energized for the warning condition, the flag 88 will wag from side to side uncovering the cross-hatched stripes of portion 90 in an alternating manner. The flag 88 must, of course, be sufficiently thin to move behind the Mach needle (not shown) and airspeed needle (not shown). At 92 is shown a Mach limit pointer which is a standard part of the equipment but involves no part of the present invention.

The flag 88 is energized by the motor 14 which is in circuit with an airplane low speed limit activated switch assembly 94 through lead line 96 and with a standard gear warning system (not shown) through line 98 (see FIG. 9). The other side of the standard gear warning system is in circuit through line 100 with the low speed limit switch assembly 94. A junction box 102 is provided between leads 98 and 100, on the one hand, and the gear warning system, on the other, in order to connect or disconnect the motor circuit from the gear warning system when desired. Between the two binding posts 104 and 105 on the junction box 102 is provided a fuse 106; while between the binding posts 107 and 108 are provided lines 109 and 110 which connects to an adjustable interrupter device such as used in the standard light-flashing circuit on airplanes. Since this interrupter device is standard, it is not shown or described in detail. This interrupter 112 acts to repeatedly interrupt the circuit for short intervals during which intervals spring 32 acts to return gear 28 to its former position thereby causing the flag 88 to wag.

Lead lines 111 and 113 connect the binding posts 104 and 107 to the existing throttle-actuated gear warning system switch (not shown). As spring 32 is cocked by motor 14 to one side and with adjustable interrupter cutting the power to the motor, the spring action of the unwinding coupled with the flag inertia allows the flag to swing to the opposite limit, at which time the interrupter cuts back in thereby starting the cycle over again. When all current action has ceased, as when the gear is down, the wagging will dampen out and position the flag over the hatching because of the neutral spring position.

The low speed limit switch assembly 94 (best shown in FIGS. 2 and 8) comprises a block 114 is connected to frame 12 by a bracket 116 having a lateral extension 117 at its upper end and a lateral extension 118 at its lower end. A bolt 119 holds the extension 117 to the frame 12. The extension 118 is held against one side of block 114 by bolts 120, washers 121 and nuts 122. One of the bolts 120 is adjustably positioned through a vertical slot 124 while a set screw 126 extends through a nut 127 and through a horizontal extension 128 of extension 118, this extension 128 underlying the block 114. With the corresponding nut 122 loosened, the set screw 126 is manipulated up or down to adjust the block 114 angularly about the other bolt 120 as a pivot. Then the nut 122 is tightened against slot 124 to hold the block 114 in adjusted position.

The block 114 is provided with a micro-switch pin 130 upon which bears a switch arm 132 extending rearwardly from an elevated front portion of block 114. This arm 132 is provided with a contact roller 134 which is in turn, in contact with the bent end of a spring arm 136 fixed, at its other end, to a bracket 138 on frame 12 by means of rivets 140. The bent end of spring arm 136 is connected to a button 142 at the lower end of a diaphragm 144. The diaphragm is operatively connected to a Pitot tube or the like whereby when the air speed decreases beyond a predetermined amount, the diaphragm reactions through spring-arm 136 and contact arm 132 to close the micro-switch and energize the motor circuit. The spring arm 136 is an integral part of any already existing airspeed indicator and the diaphragm 144 is the same one that activates the airspeed indicator needle. Consequently these standard parts which are already in position are readily utilized in the present invention without costly modifications. If the switch is a normally closed one, the contraction of the diaphragm 144 lifts up the arm 136 which permits lifting of arm 132 to close the switch. The pivotal adjustment of block 114 by means of set screw 126 provides for repositioning of the arm 132 and thereby of spring arm 136 thereby permitting adjustment of the airspeed as indicated by the movement of the diaphragm 144.

The standard gear warning system (not shown) is activated by the throttle which, in turn, is operatively connected to the gear lowering system.

When the plane has been slowed down to the point where the low speed limit switch 94 has been activated and the throttle has been retarded, a complete circuit is established through the motor 14 and the flag 88 is caused to operate. Where the standard gear warning system is not activated because the throttle has not been retarded, or where the air speed has not reached the predetermined low speed limit, the motor 14 will remain inoperative. This permits the flag 88 to operate only when there is an actual intention to land as where both conditions exist. Where the gear is not down, a lower than normal power setting will be required in order to conform to landing speed. Therefore, the throttle setting will necessarily be reduced to an extent sufficient to activate the switch incorporated therein as a part of the standard warning system. With the airspeed sufficiently reduced at the same time, the circuit through the motor 14 will be established and the flag 88 will be actuated.

In FIG. 10 there is illustrated a modified form of flag assembly wherein the dial face 150 is provided with radiating slots 152 forming a fan shape. In this case, the fan shaped flag 154, similar to flag 88, is positioned behind the dial face 150. Therefore, when the flag 154 is operated, a rapidly alternating movement is indicated in the slots 152. This arrangement ensures that the flag 154 does not interfere in any manner with the movement of the needle on the front face of the dial.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A landing gear warning system for aircraft comprising a flag on the speed indicator dial face of an aircraft, means operatively connecting said flag to an electric motor, and an actuating circuit for said motor including a diaphragm-actuated switch adapted to be closed when the airspeed of the aircraft falls below a predetermined value and a throttle-actuated switch adapted to be closed by movement of the throttle beyond a predetermined limit, said motor being operative only when both said switches are closed.

2. The system of claim 1 wherein said flag overlies the outer face of the dial and overlies a vari-colored portion of the dial face.

3. The system of claim 1 wherein said flag underlies the dial face and is visible through corresponding slots on the dial face.

References Cited in the file of this patent

UNITED STATES PATENTS

| | | |
|---|---|---|
| 2,306,877 | Gould | Dec. 29, 1942 |
| 2,535,429 | Kuntny | Dec. 26, 1950 |
| 2,778,004 | Lear et al. | Jan. 15, 1957 |
| 3,034,096 | Craddock | May 8, 1960 |